United States Patent
Beh

(10) Patent No.: US 12,502,827 B2
(45) Date of Patent: Dec. 23, 2025

(54) MULTIMODALITY METHOD AND SYSTEM FOR PRINTING A THREE-DIMENSIONAL CONSTRUCT OR PART THEREOF

(71) Applicant: AGENCY FOR SCIENCE, TECHNOLOGY AND RESEARCH, Singapore (SG)

(72) Inventor: Weijie Cyrus Beh, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 126 days.

(21) Appl. No.: 18/557,509

(22) PCT Filed: Apr. 27, 2022

(86) PCT No.: PCT/SG2022/050253
§ 371 (c)(1),
(2) Date: Oct. 26, 2023

(87) PCT Pub. No.: WO2022/231521
PCT Pub. Date: Nov. 3, 2022

(65) Prior Publication Data
US 2024/0217170 A1    Jul. 4, 2024

(30) Foreign Application Priority Data
Apr. 30, 2021  (SG) .............................. 10202104532S

(51) Int. Cl.
*B29C 64/124* (2017.01)
*B29C 64/112* (2017.01)
(Continued)

(52) U.S. Cl.
CPC .......... *B29C 64/124* (2017.08); *B29C 64/112* (2017.08); *B29C 64/209* (2017.08);
(Continued)

(58) Field of Classification Search
CPC ...................................................... B29C 64/40
See application file for complete search history.

(56) References Cited

U.S. PATENT DOCUMENTS 7,625,512 B2 * 12/2009 Cruz-Uribe ........... B29C 64/188
264/308
7,917,243 B2 * 3/2011 Kozlak .................. B29C 64/106
700/98

(Continued)

FOREIGN PATENT DOCUMENTS

| DE | 102018124516 A1 * | 4/2020 | ............. B33Y 80/00 |
| WO | 2018182536 A1 | 10/2018 | |
| WO | 2022231521 A1 | 11/2022 | |

OTHER PUBLICATIONS

Bhattacharjee et al, Writing i the granular gel medium, Science Advances, vol. 1, No. 8, Sep. 25, 2015 (Year: 2015).*

(Continued)

*Primary Examiner* — Timothy Kennedy
(74) *Attorney, Agent, or Firm* — Kilpatrick Townsend & Stockton LLP

(57) ABSTRACT

There is provided a multimodality method and a system for printing a three-dimensional (3D) construct or part thereof, the method comprising: (i) supporting a flowable precursor with a flowable support at a position that allows said flowable precursor to be crosslinked through irradiation by an irradiation source; (ii) depositing one or more materials on/within the flowable precursor; and (iii) crosslinking through irradiation by the irradiation source, at least part of the flowable precursor that is in contact with the one or more materials in the flowable precursor to form the 3D construct or part thereof.

20 Claims, 9 Drawing Sheets

(51) Int. Cl.
    *B29C 64/209*     (2017.01)
    *B29C 64/264*     (2017.01)
    *B29C 64/336*     (2017.01)
    *B29C 64/40*     (2017.01)
    *B33Y 10/00*     (2015.01)
    *B33Y 30/00*     (2015.01)

(52) U.S. Cl.
    CPC .......... *B29C 64/264* (2017.08); *B29C 64/336* (2017.08); *B29C 64/40* (2017.08); *B33Y 10/00* (2014.12); *B33Y 30/00* (2014.12)

(56) References Cited

U.S. PATENT DOCUMENTS

| | | | | |
|---|---|---|---|---|
| 8,858,856 | B2* | 10/2014 | Kozlak | B29C 64/188 |
| | | | | 264/308 |
| 10,005,235 | B2* | 6/2018 | Millar | B29C 64/40 |
| 10,117,968 | B2* | 11/2018 | Lewis | A61L 27/3813 |
| 10,363,706 | B2* | 7/2019 | Lu | B29C 64/40 |
| 11,007,705 | B2* | 5/2021 | Angelini | B29C 64/106 |
| 11,192,292 | B2* | 12/2021 | Fernandez-Nieves | |
| | | | | B29C 64/153 |
| 2003/0090034 | A1* | 5/2003 | Mulhaupt | B33Y 30/00 |
| | | | | 425/375 |
| 2017/0120535 | A1* | 5/2017 | MacCurdy | B29C 64/112 |
| 2018/0281295 | A1* | 10/2018 | Tibbits | B33Y 70/00 |
| 2019/0275746 | A1* | 9/2019 | Huang | B29C 64/112 |
| 2020/0198251 | A1* | 6/2020 | Huang | C08K 3/36 |
| 2022/0031480 | A1* | 2/2022 | Bause | B29C 64/106 |

OTHER PUBLICATIONS

Hajash et al., Large-Scale Rapid Liquid Printing, 2017, 3D Printing and Additive Manufacturing, vol. 4, No. 3, 123-131(Year: 2017).*
Application No. PCT/SG2022/050253, International Preliminary Report on Patentability, Mailed On Oct. 20, 2022, 12 pages.
Application No. PCT/SG2022/050253, International Search Report and Written Opinion, Mailed On Jul. 15, 2022, 10 pages.
Beh, C.W. et al., "A Fluid-Supported 3D Hydrogel Bioprinting Method Biomaterials", Jul. 21, 2021, vol. 276, pp. 121034 [Retrieved on Jul. 6, 2022] <DOI: 10.1016/J.BIOMATERIALS.2021.121034> Sections 2.5, 4.5, figures 1, 5.
Kolesky, D.B. et al., "3D Bioprinting of Vascularized, Heterogeneous Cell-Laden Tissue Constructs." Advanced Materials, Feb. 18, 2014, vol. 26, No. 19, pp. 3124-3130 [Retrieved on Jul. 6, 2022] <DOI: 10.1002/ADMA.201305506> Experimental methods: Ink formulations, multi-material 3D bioprinting.

* cited by examiner

MULTIMODALITY METHOD AND SYSTEM FOR PRINTING A THREE-DIMENSIONAL CONSTRUCT OR PART THEREOF

CROSS REFERENCE TO RELATED APPLICATIONS

This application is a 371 National phase filing of PCT/SG2022/050253, filed Apr. 27, 2022, which application claims priority to Singapore patent application Ser. No. 10202104532S, filed Apr. 30, 2021, the contents of which are hereby incorporated by reference in their entirety for all purposes.

TECHNICAL FIELD

The present disclosure relates broadly to a multimodality method and system for printing a three-dimensional (3D) construct or part thereof.

BACKGROUND

Multimodality 3D printing is an area that is of great interest, since most manufactured goods are made of more than one material. Multimodality printing can be used in bioprinting to combine both soft and hard materials, for example, to create structures like bone/ligament interfaces, as well as to create vessel-containing bioprinted structures. Multimodality 3D printing can also combine other material deposition methods such as inkjet printing to allow concentration gradients of materials like biologics to be established in a bioprinted structure.

However, conventional 3D printers may not be suitable for multimodality printing, as they typically feature two solid surfaces—a build plate and a patterning screen/projection window. In use, the build plate is typically brought close to the patterning screen, and gradually lifted as the material is crosslinked. Such a configuration leaves no space between the build plate and the patterning screen for introducing a secondary modality(ies) (e.g., extruders and/or print heads) for depositing other material(s).

In addition, the vast majority of bioprinters employ syringe-extrusion, where a hydrogel bioink that may contain cells is deposited by rastering the syringe to create each layer, and then stepping through to the next layer. In such systems, a trade-off exists between resolution, speed, and cell compatibility—one of which will invariably have to be sacrificed. For example, the inventor previously developed a 3D printer that could print viable cells at speeds of up to 200 mm/hr, at least an order of magnitude faster than previous systems. However, the absence of vasculature in the printed structures limits the thickness of the structures to hundreds of microns, before diffusion limits affect cell viability.

Thus, there is a need for a multimodality method and system for printing a 3D construct or part thereof, which seek to address or at least ameliorate one of the above problems.

SUMMARY

In one aspect, there is provided a multimodality method of printing a three-dimensional (3D) construct or part thereof, the method comprising: (i) supporting a flowable precursor with a flowable support at a position that allows said flowable precursor to be crosslinked through irradiation by an irradiation source; (ii) depositing one or more materials on/within the flowable precursor; and (iii) crosslinking through irradiation by the irradiation source, at least part of the flowable precursor that is in contact with the one or more materials in the flowable precursor to form the 3D construct or part thereof.

In one embodiment, the method further comprises: (iv) supporting the flowable precursor at a new position that allows the flowable precursor to be crosslinked through irradiation by the irradiation source; (v) optionally further depositing the one or more materials on/within the flowable precursor; (vi) further crosslinking through irradiation by the irradiation source, at least part of the flowable precursor that is optionally in contact with the one or more materials at the new position to form the 3D construct or part thereof; and (vii) optionally repeating steps (iv) to (vi) until a desired 3D construct is formed.

In one embodiment, depositing one or more materials comprises extruding a sacrificial material to form an arrangement of one or more sacrificial structures in the 3D construct.

In one embodiment, the method further comprises removing the sacrificial material from the arrangement of one or more sacrificial structures to form an arrangement of one or more channels in the 3D construct.

In one embodiment, the one or more channels comprise open ends that facilitate fluid communication between an internal environment of the 3D construct and an external environment of the 3D construct.

In one embodiment, the sacrificial material is in a semi-solid or gel state when extruded to form the arrangement of one or more sacrificial structures.

In one embodiment, removing the sacrificial material comprises liquefying the sacrificial material to facilitate its removal from the 3D construct or part thereof.

In one embodiment, liquefying the sacrificial material comprises cooling the sacrificial material to a temperature that causes the sacrificial material to be liquefied.

In one embodiment, depositing one or more materials comprises propelling droplets containing the one or more materials on the flowable precursor.

In one embodiment, propelling droplets containing the one or more materials on the flowable precursor comprises propelling the droplets at a variable rate such that a spatial concentration gradient of the one or more materials is formed in the 3D construct.

In one embodiment, the step of crosslinking through irradiation by the irradiation source is carried out in a bottom-up direction such that the 3D construct or part thereof is formed layer by layer in the bottom-up direction.

In one embodiment, the step of crosslinking through irradiation by the irradiation source is carried out continuously.

In one embodiment, depositing the one or more materials on/within the flowable precursor comprises depositing the one or more materials in a top-down direction towards a top surface of the flowable precursor.

In one embodiment, the flowable support is immiscible with the flowable precursor.

In one embodiment, the flowable precursor and the one or more materials are biocompatible.

In one embodiment, the 3D construct has a higher density than the flowable precursor and the flowable support.

In one embodiment, the flowable precursor and/or the one or more materials comprise cells.

In one aspect, there is provided a multimodality system for performing the multimodality method as disclosed herein, the system comprising: a tank configured to contain a flowable support and a flowable precursor disposed above the flowable support; an irradiation source configured to irradiate the flowable precursor; one or more dispensing outlets disposed between the tank and the irradiation source and configured to deposit one or more materials on/within the flowable precursor; wherein the irradiation source is configured to crosslink through irradiation, at least part of the flowable precursor that is in contact with the one or more materials in the flowable precursor to form the 3D construct or part thereof.

In one embodiment, the one or more dispensing outlets comprise an extruder nozzle for extruding a sacrificial material to form a template for an arrangement of one or more channels in the 3D construct.

In one embodiment, the one or more dispensing outlets comprise an inkjet nozzle for propelling droplets containing the one or more materials on the flowable precursor.

Definitions

The term "biocompatible" as used herein is to be interpreted broadly to refer to the ability of a material to perform its intended function without inducing significant inflammatory response, immunogenicity, or cytotoxicity to native cells, tissues, or organs.

The term "cell," as used herein, refers to individual cells, cell lines, primary cultures, or cultures derived from such cells unless specifically indicated.

The term "substrate" as used herein is to be interpreted broadly to refer to any supporting structure.

The term "layer" when used to describe a first material is to be interpreted broadly to refer to a first depth of the first material that is distinguishable from a second depth of a second material. The first material of the layer may be present as a continuous film, as discontinuous structures or as a mixture of both. The layer may also be of a substantially uniform depth throughout or varying depths. Accordingly, when the layer is formed by individual structures, the dimensions of each of individual structure may be different. The first material and the second material may be same or different and the first depth and second depth may be same or different.

The term "continuous" when used to describe printing of a 3D construct broadly refers to a manner in which formation of the 3D construct is carried out where there are no appreciable stoppages, breaks or pauses occurring in between the successive portions or sections of the 3D construct formed.

The term "substantially transparent to light" when used herein to describe an object is to be interpreted broadly to mean that 50% or more of the incident light normal to surface of the object can be transmitted through the object. In some examples, the object that is substantially transparent to light allow 60% or more, 65% or more, 70% or more, 80% or more, 85% or more, 90% or more or 95% or more of the incident light normal to surface of the object to be transmitted. In one example, the object that is substantially transparent to light allow above 70% of the incident light normal to surface of the object to be transmitted.

The term "micro" as used herein is to be interpreted broadly to include dimensions from about 1 micron to about 1000 microns.

The term "nano" as used herein is to be interpreted broadly to include dimensions less than about 1000 nm.

The term "particle" as used herein broadly refers to a discrete entity or a discrete body. The particle described herein can include an organic, an inorganic or a biological particle. The particle used described herein may also be a macro-particle that is formed by an aggregate of a plurality of sub-particles or a fragment of a small object. The particle of the present disclosure may be spherical, substantially spherical, or non-spherical, such as irregularly shaped particles or ellipsoidally shaped particles. The term "size" when used to refer to the particle broadly refers to the largest dimension of the particle. For example, when the particle is substantially spherical, the term "size" can refer to the diameter of the particle; or when the particle is substantially non-spherical, the term "size" can refer to the largest length of the particle.

The terms "coupled" or "connected" as used in this description are intended to cover both directly connected or connected through one or more intermediate means, unless otherwise stated.

The term "associated with", used herein when referring to two elements refers to a broad relationship between the two elements. The relationship includes, but is not limited to a physical, a chemical or a biological relationship. For example, when element A is associated with element B, elements A and B may be directly or indirectly attached to each other or element A may contain element B or vice versa.

The term "adjacent" used herein when referring to two elements refers to one element being in close proximity to another element and may be but is not limited to the elements contacting each other or may further include the elements being separated by one or more further elements disposed therebetween.

The term "and/or", e.g., "X and/or Y" is understood to mean either "X and Y" or "X or Y" and should be taken to provide explicit support for both meanings or for either meaning.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For example, when "comprising" is used, reference to a "one" feature is also intended to be a reference to "at least one" of that feature. Terms such as "consisting", "consist", and the like, may in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. It is to be appreciated that the individual numerical values within the range also include integers, fractions and decimals. Furthermore, whenever a range has been described, it is also intended that the range covers and teaches values of up to 2 additional decimal places or significant figures (where appropriate) from the shown numerical end points. For example, a description of a range of 1% to 5% is intended to have specifically disclosed the ranges 1.00% to 5.00% and also 1.0% to 5.0% and all their intermediate values (such as 1.01%, 1.02% . . . 4.98%, 4.99%, 5.00% and 1.1%, 1.2% . . . 4.8%, 4.9%, 5.0% etc.,) spanning the ranges. The intention of the above specific disclosure is applicable to any depth/breadth of a range.

Additionally, when describing some embodiments, the disclosure may have disclosed a method and/or process as a particular sequence of steps. However, unless otherwise required, it will be appreciated that the method or process should not be limited to the particular sequence of steps disclosed. Other sequences of steps may be possible. The particular order of the steps disclosed herein should not be construed as undue limitations. Unless otherwise required, a method and/or process disclosed herein should not be limited to the steps being carried out in the order written. The sequence of steps may be varied and still remain within the scope of the disclosure.

Furthermore, it will be appreciated that while the present disclosure provides embodiments having one or more of the features/characteristics discussed herein, one or more of these features/characteristics may also be disclaimed in other alternative embodiments and the present disclosure provides support for such disclaimers and these associated alternative embodiments.

DESCRIPTION OF EMBODIMENTS

Non-limiting embodiments of a multimodality method of printing a 3D construct or part thereof, and a multimodality system for performing the multimodality method of printing the 3D construct or part thereof, are disclosed hereinafter.

In various embodiments, there is provided a multimodality method of printing a three-dimensional (3D) construct or part thereof, the method comprising: (i) supporting a flowable precursor with a flowable support at a position that allows said flowable precursor to be crosslinked through irradiation by an irradiation source; (ii) depositing one or more materials on/within the flowable precursor; and (iii) crosslinking through irradiation by the irradiation source, at least part of the flowable precursor that is in contact with the one or more materials in the flowable precursor to form the 3D construct or part thereof.

In various embodiments, the one or more materials are deposited using one or more modalities that are different from the modality for crosslinking the flowable precursor. In various embodiments, the step of crosslinking the flowable precursor through irradiation by the irradiation source is performed by a first printing modality. The first printing modality may be for example a Fluid-supported Liquid Interface Polymerization (FLIP) printer in accordance with various embodiments as disclosed herein. In various embodiments, the step of depositing the one or more materials on/within the flowable precursor is performed using a second or further printing modality, e.g., inkjet or extrusion printing, different from the first printing modality (e.g., fluid-supported liquid interface polymerization). In various embodiments, where there are more than two printing modalities used in the method, the second and further (e.g., third) printing modalities may be the same as or different from each other, but both the second and third printing modalities are different from the first printing modality.

In various embodiments, the one or more materials may be the same or different from the crosslinked flowable precursor. In various embodiments, the one or more materials may differ from the crosslinked flowable precursor in terms of physical/mechanical (e.g., shape, size, mass, volume, density, melting point, ductility, stiffness etc.) and/or chemical (e.g., chemical composition, pH, reactivity, speed of reaction, ionic strength, bonding strength etc.) characteristics/properties. In various embodiments, if there are a plurality of different materials being deposited on/within the flowable precursor, the modalities used for the deposition of different materials may be different from one another. In various embodiments, the one or more materials may be incorporated into the 3D construct, e.g., the final structure of the 3D construct.

In various embodiments, the method further comprises: (iv) supporting the flowable precursor at a new position that allows the flowable precursor to be crosslinked through irradiation by the irradiation source; (v) optionally further depositing the one or more materials on/within the flowable precursor; (vi) further crosslinking through irradiation by the irradiation source, at least part of the flowable precursor that is optionally in contact with the one or more materials at the new position to form the 3D construct or part thereof; and (vii) optionally repeating steps (iv) to (vi) until a desired 3D construct is formed. In various embodiments, step (v) of further depositing the one or more materials on/within the flowable precursor may be optional for some iterations of steps (iv) to (vi), such that the one or more materials is/are present in selected portions or regions of the 3D construct only.

Advantageously, the multimodality method may be used for printing a 3D construct comprising more than one type of material, i.e., multi-material printing. Various embodiments of the method may be used in bioprinting applications for printing living 3D constructs (i.e., cell-containing constructs) such as bone/ligament interfaces and vessel-containing bioprinted structures, constructs with complex geometry associated with anatomical structures.

In various embodiments, the flowable precursor that is being supported by the flowable support comprises a top surface that is in interface with, or exposed to, a fluid medium. In various embodiments, the fluid medium may be air, or an inert gas or liquid (e.g., mineral or silicone oils) that for example does not react with the precursor and/or does not react (e.g., crosslink) in the presence of irradiation by the irradiation source. In various embodiments, the fluid medium is also one that allows irradiation to pass through. In various embodiments, the method is devoid of a screen or a panel (e.g., glass screen) in contact with the top surface of the flowable precursor. In various embodiments, patterns are projected directly onto a thin layer (e.g., about 3 mm thick) of fluid-supported precursor (e.g., hydrogel precursor), which serves as a floating liquid projection screen. This advantageously avoids inadvertent adhesion to a screen or a panel (e.g., glass screen) that affects typical resin-based 3D printers and enables fast continuous printing.

In various embodiment, the top surface of the flowable precursor provides a free surface at the precursor-fluid medium interface that is relatively unobstructed. Advantageously, such a configuration of the first printing modality provides great flexibility in introducing/incorporating other different printing modalities due to the degree of spatial access provided by the free surface. The free surface of the flowable precursor may advantageously allow or facilitate the addition of the one or more materials onto the flowable precursor. For example, in a 3D printer setup (e.g., a Fluid-supported Liquid Interface Polymerization (FLIP) printer) for performing the method as disclosed herein, the free surface may advantageously allow other printing modalities, such as extrusion or piezoelectric deposition of one or more different materials, to be combined or integrated into the 3D printer setup. Some advantages of using different modalities may include the ability to increase throughput (e.g., some other modalities enable faster printing of certain finer intricate structures within the 3D construct); ease of introducing different types of materials in the 3D construct; allow intermittent cooling/inoperation/recharging of the different modalities when they are interchanged in operation while still allowing seamless, continuous printing thus improving lifespan of the parts and enhance efficiency.

In various embodiments, the flowable precursor that is being supported by the flowable support comprises a bottom surface that is in interface with, or exposed to, the flowable support. In other words, the flowable precursor is disposed (e.g., floating) above the flowable support. In various embodiments, the flowable precursor may interface directly with the flowable support or indirectly with one or more intervening intermediate layers disposed between the flowable precursor and the flowable support (e.g., another flowable liquid or separating substrate/solid). In various embodiments, the flowable precursor is immiscible with the flowable support and forms separate distinct phases with each other. Advantageously, the flowable support provides the required buoyancy to support the flowable precursor so that it is suitably presented/propped up towards the irradiation source for crosslinking. In various embodiments, the buoyancy of the flowable support is sufficient to support the flowable precursor but is insufficient to cause the 3D construct to float in/on the flowable support. Hence, in various embodiments, the 3D construct is still supported by a build plate. In various embodiments, the flowable support has a density that is higher than that of the flowable precursor and the fluid medium has a density that is lower than that of the flowable precursor. In various embodiment, the 3D construct has a density that is higher than that of the flowable precursor, flowable support, and fluid medium.

In various embodiments, the flowable precursor is disposed between the flowable support and a fluid medium (e.g., air), for example the flowable precursor interfaces with the flowable support as well as the fluid medium. In various embodiments, the flowable precursor (the entire flowable precursor) may directly interface with the flowable support and the fluid medium, i.e., there are no other intervening layer(s); in other words, the flowable precursor may be in direct contact with the fluid medium and the flowable support, for example, the top surface of the flowable precursor forms an interface with the fluid medium and the bottom surface of the flowable precursor forms an interface with the flowable support. In various embodiments, the flowable precursor interfaces with the flowable support as well as the fluid medium in a configuration as follows: flowable support-flowable precursor-fluid medium. In other words, the flowable precursor may be sandwiched between the flowable support and the fluid medium with no intermediate solid screen/panel (e.g., glass screen) present.

In various embodiments, the step of supporting the flowable precursor at the new position comprises adjusting/changing the position/level of said flowable precursor. In various embodiments, the step of adjusting/changing the position/level of said flowable precursor comprises adjusting/changing the position/level of the flowable support. For example, the step of adjusting the position of the top surface of the flowable precursor to be crosslinked comprises adjusting the position of an upper interface of the flowable support (e.g., a top surface of the flowable support that interfaces with another medium such as the precursor). The step of adjusting may then additionally also comprise adjusting the position of the intervening intermediate layer(s). In various embodiments, adjusting the position of an upper interface of the flowable support results in the position/level of any the intervening intermediate layer(s) and/or the position of said top surface of the flowable precursor to change or be adjusted in tandem. In various embodiments, as the position/level of the flowable precursor is being raised, patterns corresponding to cross sections of the 3D construct to be printed are sequentially transferred onto the flowable precursor by the irradiation source, such that the flowable precursor is crosslinked according to said patterns.

In various embodiments, the step of adjusting/changing the position/level of the flowable support comprises raising the level of the flowable support (e.g., by increasing the volume of the flowable support and/or by moving the level of a base (such base may be a solid substrate or an intermediate liquid layer) which the flowable support rests on, upwards without changing the volume of the flowable support. In various embodiments, the step of increasing the volume of the flowable support may comprise maintaining a laminar inflow of the flowable support (e.g., having a Reynolds number of about 3) into a container/tank where the flowable precursor is held, to minimize or prevent disruption to the crosslinking process of the flowable precursor. In various embodiments, the flowable precursor interfaces with the flowable support, and thus, the step of adjusting may additionally/alternatively comprise adjusting the position of the interface between the flowable precursor and the flowable support.

In various embodiments, the step of supporting the flowable precursor at the new position comprises adjusting/changing the position/level of said flowable precursor relative to the 3D construct or part thereof. In various embodiments, the step of adjusting/changing the relative position/level of said flowable precursor may comprise adjusting/changing the position/level of the 3D construct or part thereof. For example, adjusting/changing the position/level of said flowable precursor relative to the 3D construct or part thereof may comprise keeping the volume of flowable support constant and changing the position of the 3D construct or part thereof relative to the flowable precursor. This may be achieved by moving a print bed that is supporting the 3D construct or part thereof in a downwards direction, such that the relative positions of the flowable precursor and 3D construct or part thereof are changed.

In various embodiments, the flowable support may be an immiscible liquid (with the precursor) and may be selected depending on the flowable precursor. For example, for an aqueous precursor, the flowable support can be a perfluorinated oil such as FC-40, HFE7500, etc., or an immiscible aqueous solution (i.e., to form an aqueous two-phase system). For common resins (if used as the flowable precursor), the support fluid (or the flowable support) may be water. In various embodiments, one criterion for selecting the flowable support is that the flowable support is denser than the flowable precursor.

In various embodiments, the flowable precursor comprises at least one polymerizable monomer/crosslinkable polymer and at least one photoinitiator. In various embodiments, the flowable precursor is a hydrogel precursor which is crosslinkable to form a hydrogel. Hydrogels can be formed using either monomers (e.g., acrylic acid, methacrylic acid), or macromonomers (e.g., gelatin methacrylate, PEG-diacrylate). Non-limiting examples of polymers or copolymers that are suitable for forming a hydrogel include polyacrylates, polymethacrylates, polyacrylamides, polymethacrylamides, polyvinylpyrrolidone and copolymers thereof. Other examples include polyethers, polyurethanes, and poly(ethylene glycol), functionalized by cross-linking groups or usable in combination with compatible cross linking agents. In various embodiments, the polymer chains may be modified with reactive groups such as acrylates or methacrylates in order for the polymer chains to be photocrosslinkable. In various embodiments, the hydrogel may comprise macromolecules including but not limited to modified polycaprolactone, gelatin, gelatin methacrylate, alginate, alginate methacrylate, modified chitosan, chitosan methacrylate, glycol chitosan, glycol chitosan methacrylate, modified hyaluronic acid (HA), HA methacrylate, and other non-crosslinked natural or synthetic polymeric chains and the like. In various embodiments, the macromolecules may be modified to make the macromolecules crosslinkable. For example, covalent crosslinks may be formed using acrylates, methacrylates, or other types of conjugation chemistry. In various embodiments, the flowable precursor may comprise gelatin methacrylate (GelMA) and/or alginate methacrylate (ALMA).

In various embodiments, the photoinitiator may be a free-radical photoinitiator that produces a free radical on exposure to radiation such as ultraviolet or visible radiation and thereby initiates a polymerization reaction. Non-limiting examples of suitable photoinitiators include benzophenones (aromatic ketones) such as benzophenone and methyl benzophenone; acylphosphine oxide type photo-initiators such as diphenyl(2,4,6 trimethylbenzoyl)phosphine oxide; benzoins and bezoin alkyl ethers such as benzoin, benzoin methyl ether and benzoin isobutyl ether and the like.

In various embodiments, the starting material for the flowable precursor may comprise a monomer (e.g., acrylic acid) or a macromonomer (e.g., poly (ethylene glycol) diacrylate (PEGDA), which is a polymer chain modified with two acrylate groups). The macromonomers may have different chain lengths (e.g., from about 100 Da to about 10,000 kDa, from about 200 Da to about 9,500 kDa, from about 300 Da to about 9,000 kDa, from about 400 Da to about 8,500 kDa, from about 500 Da to about 8,000 kDa).

In various embodiments, the concentration of monomers or macromonomers is in the range of about 1% to about 100% by weight of the entire flowable precursor, depending on the type of material used to make the 3D construct. For a 3D hydrogel construct, the concentration of the monomers or macromonomers may be in the range with start and end points selected from the following group of numbers: 1, 2, 3, 4, 5, 6, 7, 8, 9, 10, 15, 20, 25, 30, 35, 40, 45, and 50% by weight of the entire flowable precursor. For a 3D plastic resin construct, the concentration of the monomers or macromonomers may be in a range with start and end points selected from the following groups of numbers: 50, 55, 60, 65, 70, 75, 80, 85, 90, 95, and 100% by weight of the entire flowable precursor.

In various embodiments, the concentration of photoinitiator is in the range of about 0.05% to about 10% by weight of the entire flowable precursor. The concentration of photoinitiator may be in the range of, for example, about 0.05% to about 10%, about 0.065% to about 9%, about 0.08% to about 8%, about 0.095% to about 7%, about 0.11% to about 6%, and about 0.125% to about 5%.

In various embodiments, the one or more materials in step (ii) is/are different from the flowable precursor. The one or more materials may differ from the flowable precursor in terms of physical and/or chemical characteristics/properties. In various embodiments, the one or more materials may be deposited using a different modality, e.g., inkjet or extrusion printing.

In various embodiments, the step of depositing one or more materials comprises extruding a sacrificial material to form an arrangement of one or more sacrificial structures in the 3D construct. In various embodiments, the sacrificial material may be extruded from a dispensing outlet e.g., an extruder nozzle that is disposed between the irradiation source and the flowable precursor. The arrangement of one or more sacrificial structures may comprise an arrangement of one or more sacrificial fibers that serve as a mold/template for an arrangement of one or more channels in the 3D construct. The sacrificial fibers may be straight or curved. The arrangement of one or more sacrificial fibers may be arranged in a regular pattern or a non-regular pattern. The one or more sacrificial structures may be shaped and sized according to a predetermined design and may serve as a mold/template for various structures in the 3D construct, such as overhanging structures, free-standing hollow structures, complex geometrical shapes associated with anatomical structures. The sacrificial structures on their own may also be three-dimensional and spans across different planes of the 3D construct.

In various embodiments, the method further comprises removing the sacrificial material from the arrangement of one or more sacrificial structures to form an arrangement of one or more channels in the 3D construct. In various embodiments, the one or more channels comprise open ends that facilitate fluid communication between an internal environment of the 3D construct and an external environment of the 3D construct. In various embodiments, the method further comprises removing the sacrificial material from the arrangement of one or more sacrificial structures to form various structures in the 3D construct, such as overhanging structures, free-standing hollow structures, complex geometrical shapes associated with anatomical structures.

In various embodiments, the sacrificial material is in a semi-solid or gel state when extruded to form the sacrificial structure. Advantageously, the gel state helps the sacrificial structure to maintain its shape and form in the liquid flowable precursor such that the sacrificial material does not mix with the flowable precursor and does not substantially lose its shape and form during formation of the 3D construct.

In various embodiments, the step of removing the sacrificial material may comprise liquefying the sacrificial material to facilitate its removal from the 3D construct or part thereof. In various embodiments, the step of liquefying the sacrificial material depends on the type of sacrificial material used. For example, the sacrificial material may be liquefied using a physical approach (for example, by changing the temperature of the sacrificial material), a chemical approach (for example, by modifying/changing the chemical composition of the sacrificial material), or a combination thereof.

In various embodiments, liquefying the sacrificial material may comprise cooling the sacrificial material to a temperature that causes the sacrificial material to be liquefied. Cooling the sacrificial material may comprise immersing the 3D construct or part thereof in a water bath having a temperature that causes the sacrificial material to be liquefied. In various embodiments, the sacrificial material may be a thermo-sensitive material that changes its physical and/or chemical properties in response to a change in temperature. The temperature at which the physical and/or chemical properties change depends on the type of sacrificial material used.

In one example, the sacrificial material may comprise a fugitive ink (e.g., poloxamer 407, also known by the trade name Pluronic F127). Depending on the concentration, F127 is configured to switch between a liquid state and a semisolid or gel state. For example, at 20% w/w concentration, the F127 material is a liquid below 20° C., is a gel from about 20° ° C. to about 70° C., and liquefies again above 70° C. The sacrificial ink is configured to remain in gel state at the printing temperature and melt away at either an elevated or lowered temperature. In other words, other materials such as agarose can also be used if the printing application allows temperatures to be raised to 40° C. to 50° C. For a bioprinting application, an elevated temperature above 40° C. is not compatible for live cells, as the elevated temperature affects cell viability and may even lead to cell death. As such, the sacrificial material should be selected such that the printing temperature is suitable for cells. For other printing applications that do not involve live cells, there may be more flexibility in the selection of sacrificial material, as cell viability may not be a factor that is taken into consideration in such printing applications.

In various embodiments, liquefying the sacrificial material may comprise changing/modifying the chemical composition of the sacrificial material to cause the sacrificial material to be liquefied. For example, changing the chemical composition of the sacrificial material may comprise removing a reversible crosslinker that is used to maintain the sacrificial material in solid or semi-solid form. In various embodiments, liquefying the sacrificial material may comprise dissolving the sacrificial material. In various embodiments, the sacrificial material may comprise alginate. Alginate molecules form gels in the presence of a crosslinking solution containing multivalent cations such as calcium. In various embodiments, alginate fibers in the gel state may be extruded to form an arrangement of one or more sacrificial structures in the 3D construct. In various embodiments, liquefying a sacrificial material made of alginate may comprise immersing the 3D construct in a chelator-containing buffer (e.g., citrate, EDTA, EGTA), which will remove the cation and cause the alginate fiber(s) to dissolve.

In various embodiments, the step of removing the sacrificial material is primarily accomplished by melting of the sacrificial material (e.g., sacrificial ink) under suitable temperature or chemical conditions. In various embodiments, the step of removing the sacrificial material may further comprise active removal or dilution of the liquefied sacrificial material from the 3D construct, e.g., by rinsing/flushing with a fluid such as water, a suitable buffer solution (e.g., chelator-containing buffer) or cell culture media to expel the liquefied sacrificial material from the 3D construct. In various embodiments, the step of removing the sacrificial material may further comprise passive removal or dilution of the liquefied sacrificial material from the 3D construct, e.g., by immersing or soaking the 3D construct in a fluid such as water, a suitable buffer solution (e.g., chelator-containing buffer) or cell culture media for a period of time to allow the liquefied sacrificial material to flow out from the 3D construct. In various embodiments, the temperature of the fluid (e.g., media) is used to cause a phase change in the sacrificial material (e.g., sacrificial ink). In various embodiments, the step of removing the sacrificial material may comprise both active and passive removal of the liquefied sacrificial material from the 3D construct.

In various embodiments, the 3D construct comprising an arrangement of one or more channels may be applied in bioprinting of 3D structures for culturing cells. The presence of channels in the 3D construct may advantageously address or ameliorate a fundamental challenge in bioprinting of providing nutrients to cells in a thick structure, beyond diffusion limits. The size, density, and arrangement of the channels may be optimised to ensure that cells distributed throughout a 3D construct can be adequately supplied with nutrients.

In various embodiments, the step of depositing one or more materials comprises propelling droplets containing the one or more materials on the flowable precursor. In various embodiments, the one or more materials may be propelled from a droplet dispensing outlet e.g., an inkjet nozzle, acoustophoretic nozzle, that is disposed between the irradiation source and the flowable precursor.

In various embodiments, the step of propelling droplets containing the one or more materials on the flowable precursor comprises propelling the droplets at a substantially uniform rate such that the one or more materials is substantially uniformly dispersed in the 3D construct. The one or more materials may be substantially uniformly dispersed in a selected region of the 3D construct or the entire 3D construct.

In various embodiments, the step of propelling droplets containing the one or more materials on the flowable precursor comprises propelling the droplets at a variable rate such that a spatial concentration gradient of the one or more materials is formed in the 3D construct, e.g., a spatial pattern of molecules in the 3D construct. The one or more materials may be dispersed at a spatial concentration gradient in a selected region of the 3D construct or the entire 3D construct. A "spatial concentration gradient" is a concentration gradient in which the concentration can vary along one or more spatial dimensions.

Non-limiting examples of the one or more materials contained in the droplets may include biological response modifiers, cytokines, growth factors, antigens, drugs, hormones, and the like. In one example, the method may be used to print a controlled spatial gradient of angiogenic factors for promoting a desired vascularization outcome within a 3D construct for tissue engineering applications. In another example, the method may be used to print a 3D construct having a first region containing a first growth factor for promoting a first type of cells (e.g., growth factor for promoting growth of cartilage cells in the first region), and a second region containing a second growth factor for promoting a second type of cells (e.g., growth factor for promoting growth of bone cells in the second region).

In various embodiments, the step of depositing one or more materials may comprise extruding a sacrificial material to form an arrangement of one or more sacrificial structures in the 3D construct only. In various embodiments, the step of depositing one or more materials may comprise propelling droplets containing the one or more materials on the flowable precursor only. In various embodiments, the step of depositing one or more materials may comprise both extruding a sacrificial material to form an arrangement of one or more sacrificial structures in the 3D construct and propelling droplets containing the one or more materials on the flowable precursor.

In various embodiments, the crosslinking of the flowable precursor occurs at, near, adjacent or in proximity to the interface of the flowable precursor and fluid medium. Advantageously, in various embodiments, only a small amount of flowable precursor or a thin layer of flowable precursor needs to be used at any one time during crosslinking. In various embodiments, a minimal thickness may reduce the amount of expensive precursor that is being used and may also help to improve the resolution by avoiding excessive photocrosslinking. This reduces wastage of valuable resources while at the same time allowing for better control of structure formation at high resolution and speed. However, the amount of precursor material should be sufficient to print the desired structure (e.g., a 10 mL volume of precursor would be insufficient to print a structure with a volume of 20 mL). The actual amount of flowable precursor required also depends for example on the properties of the precursor (e.g., viscosity, surface tension, etc.) but in various embodiments, as an example, an approximately 3 mm thick layer of the flowable precursor may be used/sufficient in 3D printing a structure. The amount of flowable precursor should ideally be sufficient to maintain a contiguous layer of the precursor. A low surface tension (e.g., by using surfactants) can help the precursor to spread out over the flowable support but may not be desirable if it is toxic to cells. In various embodiments, the layer of the flowable precursor may have a thickness/height ranging from about 0.5 mm to about 5 mm. The layer of the flowable precursor may be in a range with start and end points selected from the following group of numbers: 0.5, 0.6, 0.7, 0.8, 0.9, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8 and 5 mm.

In various embodiments, the step of crosslinking through irradiation at least part of the precursor comprises irradiating at least part of the precursor to be crosslinked with an electromagnetic wave from an electromagnetic wave source (i.e., the irradiation source). In various embodiments, the flowable precursor is capable of being crosslinked upon application of an electromagnetic irradiation. The electromagnetic irradiation may include, but not limited to, infrared waves, ultraviolet waves or electromagnetic waves having wavelengths in the visible light spectrum. In various embodiments, the flowable support is not crosslinkable by application of the same electromagnetic irradiation that crosslinks the flowable precursor. Likewise, in various embodiments, the fluid medium that interfaces with the top of the layer of flowable precursor is not crosslinkable by application of the same electromagnetic irradiation that crosslinks the flowable precursor.

In various embodiments, the electromagnetic irradiation is in the form of a projection onto the flowable precursor from an electromagnetic wave source (e.g., an illumination or irradiating source). In various embodiments, the projection onto the flowable precursor corresponds to a cross-sectional area of the 3D construct that is to be formed from the crosslinking of the precursor. In various embodiments, the projection (corresponding to the cross-sectional area of the 3D construct to be formed) continuously changes as the position/level of said flowable precursor in contact or in interface with a part of the 3D construct to be formed changes and/or as the crosslinking occurs.

In various embodiments, the flowable precursor is irradiated at a direction that is substantially perpendicular to the surface of the flowable precursor (e.g., the plane of the flowable precursor-fluid medium interface). In various embodiments, the step of crosslinking through irradiation by the irradiation source is carried out in a bottom-up direction such that the 3D construct or part thereof is formed layer by layer in the bottom-up direction. In various embodiments, the step of depositing the one or more materials on/within the flowable precursor comprises depositing the one or more materials in a top-down direction towards the top surface of the flowable precursor.

In various embodiments, the step of crosslinking through irradiation at least part of the precursor occurs simultaneously with the step of depositing the one or more materials on/within the flowable precursor. For example, the sacrificial material may be extruded to form an arrangement of one or more sacrificial structures in the 3D construct while crosslinking occurs in the flowable precursor. Although extrusion of the sacrificial material may require the extruder nozzle to be temporarily positioned between a projector and the flowable precursor, the extrusion of the sacrificial material may occur faster than the crosslinking of the flowable precursor. As such, extrusion of the sacrificial material may not significantly affect the crosslinking process. In alternative embodiments, the step of crosslinking through irradiation at least part of the precursor and the step of depositing the one or more materials on/within the flowable precursor may occur sequentially. For example, the one or more materials may first be deposited on/within the flowable precursor, followed by crosslinking of the flowable precursor by the irradiation source.

In various embodiments, the step of adjusting/changing the position/level of the flowable precursor is carried out at a rate that substantially matches or is substantially in tandem with (or is substantially proportional to) the rate of crosslinking of the flowable precursor. For example, the step of adjusting the position of the top surface of the flowable precursor is carried out at a rate that substantially matches with the rate the flowable precursor is crosslinked. In various embodiments, the rate of increasing the volume of flowable support and/or the rate of adjusting/changing the position/level of the flowable precursor matches or is also in tandem with (or is substantially proportional to) the rate of crosslinking of the flowable precursor. In various embodiments, the method is a continuous printing method and/or a rapid printing method. In various embodiments, the method is a continuous printing method, for example even with the use of different modalities for depositing the one or more materials. In various embodiments, the step of crosslinking through irradiation by the irradiation source is carried out continuously without pausing. In various embodiments, continuous printing advantageously enables printing of 3D constructs that are substantially free of layering artifacts which may occur as a result of a non-continuous printing process.

In various embodiments, the method may further comprise removing the flowable support from the 3D construct. During printing, the 3D construct or part thereof that is already printed is disposed on the build plate and is immersed in the flowable support (i.e., support fluid). After printing, the support fluid is removed from the printed 3D construct, e.g., by rinsing with another fluid such as water or a suitable buffer solution.

In various embodiments, the method may have a print speed of from about 0.05 mm/min (or about 3 mm/h) about 5 mm/min (or about 300 mm/h) along a vertical axis that is perpendicular to the surface plane of the flowable precursor. For ease of understanding, the X- and Y-axes are defined to be parallel to the surface plane of the flowable precursor and the Z axis is defined to be perpendicular to the surface plane of the flowable precursor. The speed of printing may be in a range with start and end points selected from the following group of numbers: 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 mm/min. In various embodiments, the print speed may be dependent on factors such as the formulation of the flowable precursor, speed of reaction of the flowable precursor, behavior of the flowable precursor when crosslinked rapidly (e.g., whether warping of the construct occurs) etc. Depending on the formulation of the flowable precursor, the 3D construct (e.g., soft hydrogel structures with complex geometry) may be printed using the method as disclosed herein in the order of a few minutes to a few hours, depending on the materials used and the size of the construct. For example, for a 3 cm tall structure, the printing time may range from 5 to 10 minutes for fast curing materials, and a few hours for very slow curing materials. In one embodiment, the method is able to print a 3D hydrogel construct at 3.3 mm/min which is faster than many DLP (Digital Light Processing) printers which typically operate at around 0.1 mm/min to 1 mm/min.

In various embodiments, the 3D construct may comprise dimensions having a scale in the order of centimeters. In various embodiments, the channels formed within the 3D construct may comprise dimensions having a scale in the order of millimeters or sub-millimeters. In various embodiments, the 3D construct may be a 3D hydrogel construct having a stiffness ranging from about 7 kPa to about 4 MPa. The stiffness of the 3D hydrogel construct may be in a range with start and end points selected from the following group of numbers: 7, 10, 20, 30, 40, 50, 60, 70, 80, 90, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, and 4000 kPa. In various embodiments, the 3D hydrogel construct may have a stiffness of more than 4 MPa. In various embodiments, the 3D construct may be a 3D plastic resin construct having a stiffness of more than about 0.1 GPa. In various embodiments, the 3D construct may have a stiffness of no more than about 1 kPa, depending on the materials and structure to be printed.

In various embodiments, the method may be used for bioprinting of 3D constructs containing cells. In various embodiments, the flowable precursor and the one or more materials are biocompatible. In various embodiments, the flowable precursor and/or the one or more materials comprise cells. In various embodiments, the method may advantageously achieve fast printing of soft materials without subjecting them to high shear, extreme temperatures, or other harsh conditions, and may be compatible with cell printing. As printing conditions are typically different from the final incubation conditions for the printed structures (in terms of osmolarity, temperature, pH, etc), the speed of printing ensures that the cells can be quickly returned to the optimal culture conditions. In various embodiments, the speed, ease of use and versatility allow the method to be used in a wide variety of manufacturing and biomedical applications.

In various embodiments, there is provided a system for performing the method disclosed herein, the system comprising: a tank configured to contain a flowable support and a flowable precursor disposed above the flowable support; an irradiation source configured to irradiate the flowable precursor; one or more dispensing outlets disposed between the tank and the irradiation source and configured to deposit one or more materials on/within the flowable precursor; wherein the irradiation source is configured to crosslink through irradiation, at least part of the flowable precursor that is in contact with the one or more materials in the flowable precursor to form the 3D construct or part thereof.

In various embodiments, the components of the system that cooperate to perform crosslinking of the flowable precursor (i.e., the tank, flowable support, irradiation source) are based on a first printing modality. The first printing modality may be for example a Fluid-supported Liquid Interface Polymerization (FLIP) printer in accordance with various embodiments as disclosed herein. In various embodiments, the one or more dispensing outlets are based on a second or further printing modality, e.g., inkjet or extrusion printing, that is different from the first printing modality (e.g., fluid-supported liquid interface polymerization).

In various embodiments, the first printing modality of the system provides a free surface at the top surface of the flowable precursor that is relatively unobstructed. The free surface of the flowable precursor may advantageously provide great flexibility in introducing/incorporating other different modalities due to the degree of spatial access provided by the free surface, thereby allowing or facilitating the addition of the one or more materials on/within the flowable precursor. Advantageously, various embodiments of the system overcome the limitations of conventional 3D printers where there is a lack of space between a build plate and a patterning screen to introduce/incorporate other different printing modalities. Some advantages of using different modalities may include the ability to increase throughput (e.g., some other modalities enable faster printing of certain finer intricate structures within the 3D construct); ease of introducing different types of materials in the 3D construct; allow intermittent cooling/inoperation/recharging of the different modalities when they are interchanged in operation while still allowing seamless, continuous printing thus improving lifespan of the parts and enhance efficiency.

In various embodiments, the one or more dispensing outlets comprise an extruder nozzle for extruding a sacrificial material to form a template for an arrangement of one or more channels in the 3D construct. In various embodiments, the one or more dispensing outlets comprise a propulsion nozzle (e.g., inkjet nozzle, acoustophoretic nozzle) for propelling droplets containing the one or more materials on the flowable precursor. In various embodiments, the one or more dispensing outlets (e.g., extruder nozzle, inkjet nozzle, acoustophoretic nozzle) are coupled to respective reservoirs containing the one or more materials (e.g., sacrificial material, additives).

In various embodiments, the propulsion nozzle may be configured to propel droplets containing the one or more materials on the flowable precursor at a substantially uniform rate such that the one or more materials is substantially uniformly dispersed in the 3D construct. The propulsion nozzle may be configured to disperse the one or more materials substantially uniformly in a selected region of the 3D construct or the entire 3D construct.

In various embodiments, the propulsion nozzle may be configured to propel droplets containing the one or more materials on the flowable precursor at a variable rate such that a spatial concentration gradient of the one or more materials is formed in the 3D construct, e.g., a spatial pattern of molecules in the 3D construct. The propulsion nozzle may be configured to disperse the one or more materials at a spatial concentration gradient in a selected region of the 3D construct or the entire 3D construct.

In various embodiments, the one or more dispensing outlets (e.g., extruder nozzle, inkjet nozzle, acoustophoretic nozzle) are configured to be movable. The one or more dispensing outlets may be configured to be movable along one or more axes. For example, the one or more dispensing outlets may be configured to be movable in a horizontal direction that is substantially parallel to the surface of the flowable precursor. The one or more dispensing outlets may be configured to be movable in a vertical direction that is substantially perpendicular to the surface of the flowable precursor. The mobility of the one or more dispensing outlets may advantageously facilitate deposition of the one or more materials on/within the flowable precursor.

In various embodiments, the system may comprise a combination of an extruder nozzle for extruding a sacrificial material to form an arrangement of one or more sacrificial structures in the 3D construct, and a propulsion nozzle for propelling droplets containing the one or more materials on the flowable precursor. Advantageously, various embodiments of the system may combine an extrusion-based printing approach with a DLP (Digital Light Processing)-like continuous 3D printing method, to create a multimodality printer that can be used to create bioprinted structures with channels, which can supply cells with nutrients needed for cell viability. In addition to a fiber extruder for creating sacrificial structures for the channels, various embodiments of the system may also be used in conjunction with propulsion nozzles e.g., inkjet and/or acoustophoretic nozzles, which can establish concentration gradients of additives e.g., cytokines, growth factors and the like, to create heterogeneous matrices.

In various embodiments, the container/tank comprises an inlet (i.e., at least one inlet) for allowing inflow of the flowable support at a predetermined rate. The system may further comprise an actuator (e.g., a pump, lift arm) for facilitating inflow of the flowable support through the inlet of the container/tank. In various embodiments, the container/tank may comprise one or more inlets, and in such embodiments, the actuator may accordingly facilitate inflow of the flowable support through the one or more inlets of the container/tank.

In various embodiments, the system further comprises a processing module configured to adjust the position of said top surface of the flowable precursor at a rate that substantially matches with the rate the flowable precursor is crosslinked by the irradiation source. In various embodiments, the processing module may be configured to control, for example, the rate of flow of the flowable support into the container/tank, the intensity of the irradiation by the irradiation source, and the position of the irradiation source etc., to synchronize these parameters that may affect the rate that the position of the top surface of the flowable precursor is adjusted and/or the rate the flowable precursor is crosslinked by the irradiation source. The processing module may also control the type and amount of the one or more material to be deposited on/within the flowable precursor, as well the timing and speed to deposition. The processing module may also control and determine the type or shape of projection to be irradiated onto the flowable precursor as the relative level (e.g., with respect to a part of the 3D construct that is already formed) of the flowable precursor is changed or varied along a vertical axis perpendicular to the top surface of flowable precursor.

In various embodiments, the system further comprises a reservoir for holding a volume of flowable support outside the container/tank. In various embodiments, the reservoir is in fluid communication with the container/tank (e.g., via the inlet(s)). In various embodiments, the flowable support is transferred from the reservoir to the container/tank using a passive pumping system e.g., gravity pumping system, by raising the position of the reservoir relative to the container/tank (e.g., by using a lift arm), thereby causing the flowable support to flow into the container/tank. Advantageously, this ensures a laminar flow of the flowable support into the container/tank to minimize or prevent disruption to the crosslinking process of the flowable precursor.

In various embodiments, the system further comprises a print bed/build plate disposed on or in the vicinity of the base of the container/tank. The print bed can support the 3D construct or part thereof. In various embodiments, the position of the build plate may also be adjustable (e.g., by the processing module) along a vertical axis substantially perpendicular to the top surface of flowable precursor such that the position of the 3D construct or part thereof relative to the flowable precursor is changed.

In various embodiments, the irradiation source is disposed over the tank (e.g., a top-down projection system), under/below the tank/object (e.g., a bottom-up projection system), beside the tank/object (e.g., a side-on projection system) and/or around the tank/object (e.g., a circumferential projection system such as a radial/ring shaped projection system).

In various embodiments, the container/tank is substantially transparent to irradiation from the irradiation source. For example, the container/tank allows transmission of electromagnetic waves emitted from the irradiation source to the flowable precursor. In various embodiments, such a container/tank may be particularly useful when a projection system other than a top-down projection system is used, i.e., when a bottom-up projection system, a side-on projection system, and/or a circumferential projection system is/are used. In various embodiments, the flowable precursor, the flowable support and the 3D construct or part thereof are disposed within the tank.

In various embodiments, there is provided a multimodality 3D printer that may be used for fabricating cell-laden hydrogel structures, and that utilizes a 3D printer having a free-surface of a flowable precursor. In various embodiments, the multimodality 3D printer is combined with other printing modalities, such as extrusion or piezoelectric deposition of a different material. In various embodiments, the multimodality 3D printer uses particular inks to create a cell laden-structure (e.g., gelatin methacrylate, alginate methacrylate, etc), as well as fugitive inks (e.g., Pluronic F127) that liquefies under low but cell-compatible temperatures, to create channels in the cell-laden structures as a means to supply nutrients. In various embodiments, the multimodality 3D printer combines free-surface printing with inkjet-style deposition of molecules (such as biologics) to create concentration gradients of said molecules within the hydrogel structure.

DETAILED DESCRIPTION OF FIGURES

Example embodiments of the disclosure will be better understood and readily apparent to one of ordinary skill in the art from the following discussions and if applicable, in conjunction with the figures. It should be appreciated that other modifications related to structural changes may be made without deviating from the scope of the invention. Example embodiments are not necessarily mutually exclusive as some may be combined with one or more embodiments to form new exemplary embodiments. The example embodiments should not be construed as limiting the scope of the disclosure.

The following examples describe a strategy for printing a 3D construct.

System for Printing a 3D Construct

Figure 1:
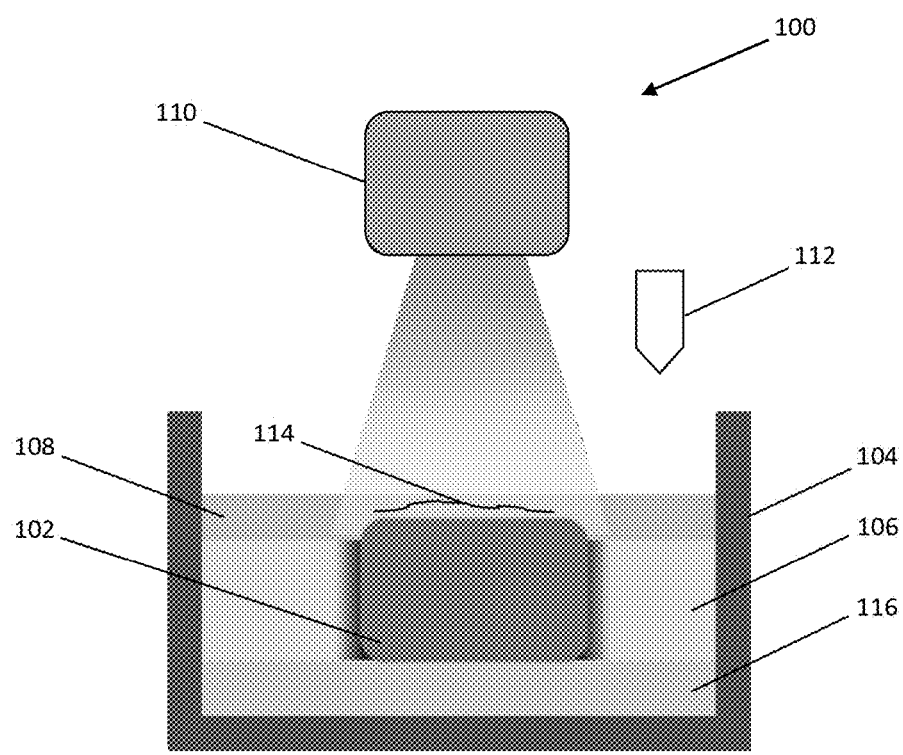
FIG. 1 is a schematic diagram illustrating a side view of a system (e.g., Fluid-supported Liquid Interface Polymerization (FLIP) printer) for printing a 3D construct or part thereof, in accordance with various embodiments disclosed herein.

FIG. 1 is a schematic diagram illustrating a side view of a system 100 (e.g., Fluid-supported Liquid Interface Polymerization (FLIP) printer) for printing a 3D construct 102 or part thereof, in accordance with various embodiments disclosed herein. The system 100 comprises a tank 104 configured to contain a flowable support 106 (e.g., a support fluid) and a flowable precursor 108 (e.g., a hydrogel precursor) disposed above the flowable support 106. The system 100 further comprises an irradiation source 110 (e.g., a patterning light source or a projector) configured to irradiate the flowable precursor 108. The system 100 further comprises a dispensing outlet 112 disposed between the tank 104 and the irradiation source 110 and configured to deposit a material 114 on/within the flowable precursor 108. The system 100 may comprise more than one dispensing outlet 112 configured to deposit more than one material 114 on/within the flowable precursor 108. The irradiation source 110 is configured to crosslink through irradiation, at least part of the flowable precursor 108 that is in contact with the material 114 to form the 3D construct 102 or part thereof. The 3D construct 102 or part thereof that is formed is disposed on a build plate 116.

In the system 100 as shown in FIG. 1, patterns from the irradiation source 110 are directly projected on the flowable precursor 108 and photocrosslinking occurs at the surface of the flowable precursor 108, floating atop the flowable support 106. This configuration frees up a top surface of the flowable precursor 108 and provides a free surface that allows the dispensing outlet 112 (e.g., an extruder) to be introduced in the gap between the irradiation source 110 and the flowable precursor 108 and deposit a different material (e.g., a second material that is different from the flowable precursor 108) into the flowable precursor 108, and onto the nascent print of the 3D construct 102 or part thereof. Such a configuration may address problems encountered in conventional 3D printers where there is a lack of space to introduce additional printing modalities that are different from the FLIP printing modality.

Figure 2:
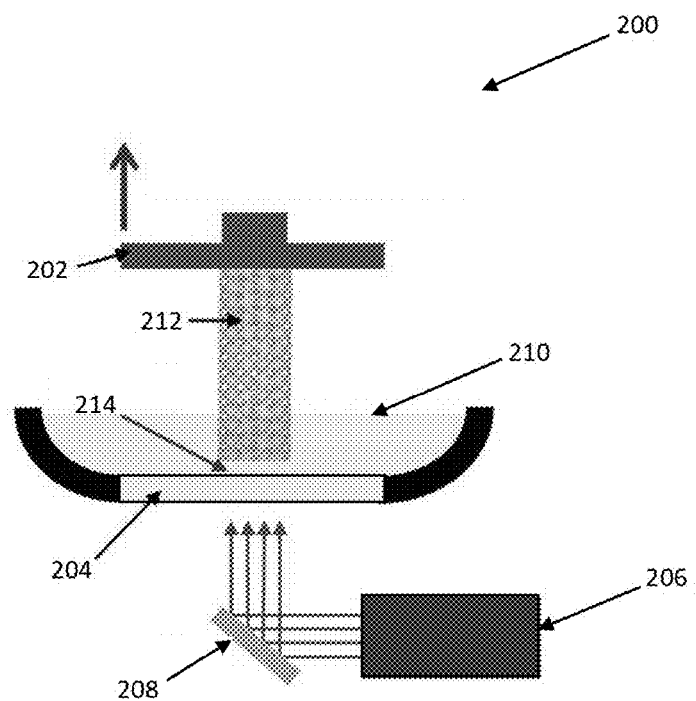
FIG. 2 is a schematic diagram illustrating a side view of a conventional 3D printing system.

For example, FIG. 2 is a schematic diagram illustrating a side view of a conventional 3D printing system 200 which highlights problems encountered in conventional 3D printers. The 3D printing system 200 comprises a build plate 202, a patterning screen 204 (e.g., oxygen permeable window), an imaging unit 206 configured to project a patterned light image onto a mirror 208 which, in turn, projects the patterned light image onto the patterning screen 204. The conventional 3D printing system 200 comprises two solid surfaces—the build plate 202 and the patterning screen 204. In use, the build plate 202 is brought close to the patterning screen 204, and gradually lifted as liquid resin 210 is crosslinked to form a 3D construct 212 or part thereof hanging from an underside of the build plate 202. In the conventional 3D printing system 200, a dead zone 214 is formed between the build plate 202 and the patterning screen 204 as the 3D construct 212 or part thereof is being formed. This leaves no space between the build plate 202 and patterning window 204 to introduce other printing modalities for depositing other materials.

Method of Printing a 3D Construct

FIGS. 3A to 3D are a series of schematic diagrams illustrating a method of printing a 3D construct or part thereof using a FLIP printer, in accordance with various embodiments disclosed herein.

Figure 3A:
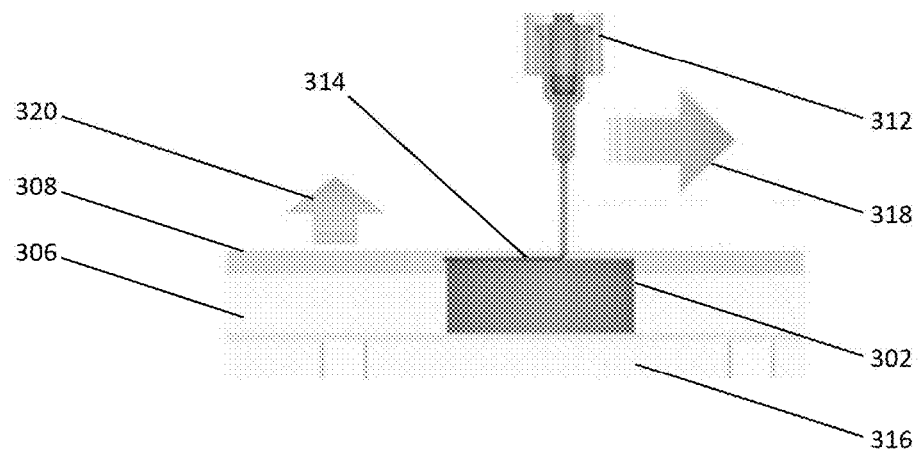
FIGS. 3A to 3D are a series of schematic diagrams illustrating a method of printing a 3D construct or part thereof using a FLIP printer, in accordance with various embodiments disclosed herein.

As shown in FIG. 3A, a flowable precursor 308 (compare 108 of FIG. 1) is supported by a flowable support 306 (compare 106 of FIG. 1) at a position that allows said flowable precursor 308 to be crosslinked through irradiation by an irradiation source (not shown, compare 110 of FIG. 1). The flowable precursor 308 is positioned such that it is contacting a top surface of a part of a cylindrical construct 302 (e.g., hydrogel construct) (compare 102 of FIG. 1) that is already printed. The part of the cylindrical construct 302 is disposed on a build plate 316 (compare 116 of FIG. 1).

In FLIP, photocrosslinking occurs in the floating precursor layer 308. As the space above the flowable precursor 308 is relatively unobstructed, this provides a free surface such that an extruder 312 (compare 112 of FIG. 1) based on a different printing modality can be used to deposit fugitive ink fibers (e.g., Pluronic F127 fibers) onto the nascent print, while the printing is still ongoing. As shown in FIG. 3A, a fiber 314 (compare 114 of FIG. 1) is formed on the top surface of the cylindrical construct 302 as fugitive ink is extruded from the extruder 312 translates horizontally across the flowable precursor 308, as shown by the block arrow 318. Extrusion of fugitive inks onto the free surface of the flowable precursor 308 during printing creates a mold/template for nutrient-supplying channels. As printing of the cylindrical construct 302 continues, the position/level of the flowable precursor 308 is raised upwards as shown by the block arrow 320 by increasing the volume of the flowable support 306.

Figure 3B:
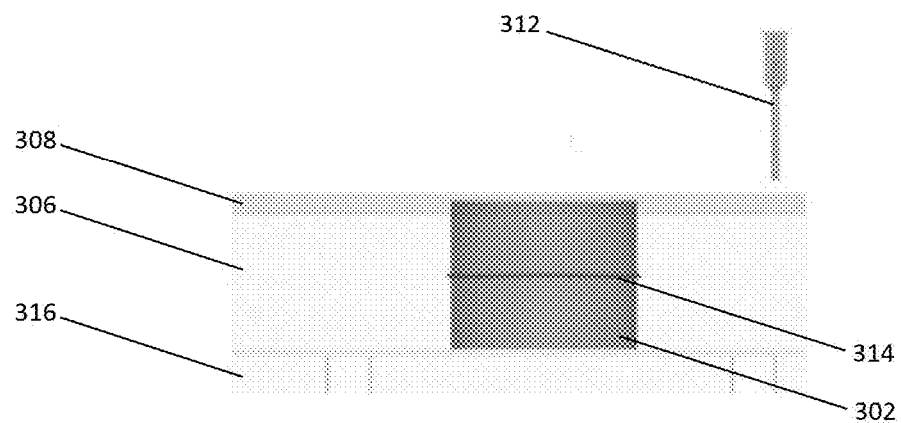
Figure 3C:
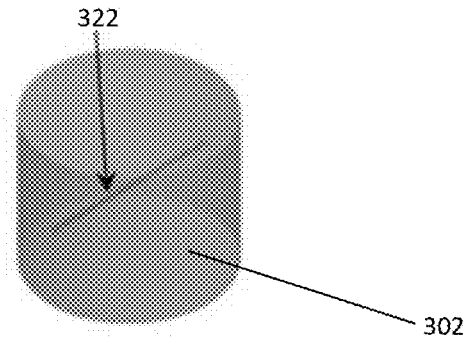
Figure 3D:
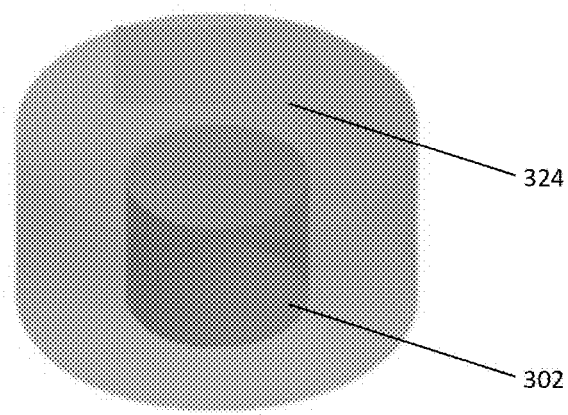

As shown in FIG. 3B, the flowable precursor 308 continues to flow over the fibers, and, upon crosslinking, embeds the fibers in the cylindrical construct 302. The cylindrical construct 302 is then immersed in an ice bath at 4° C. to liquefy the fiber 314. FIG. 3C shows a schematic perspective viewing of the cylindrical construct 302 with a channel 322 formed at the location where the fiber 314 was originally embedded. As shown in FIG. 3D, the cylindrical construct 302 with the channel 322 is then immersed in culture media 324 such that the culture media fills the channel 322.

Figure 4A:
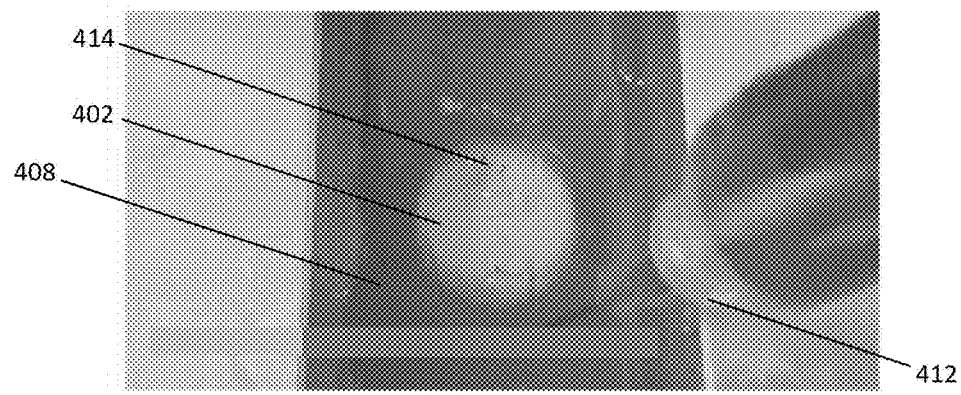
FIGS. 4A, 4B and 4C are screenshots from a video demonstrating a process of printing a 3D construct, in accordance with various embodiments disclosed herein.
Figure 4B:
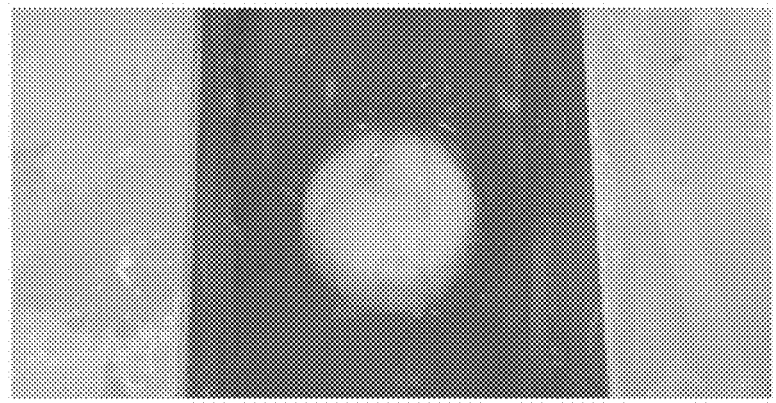
Figure 4C:
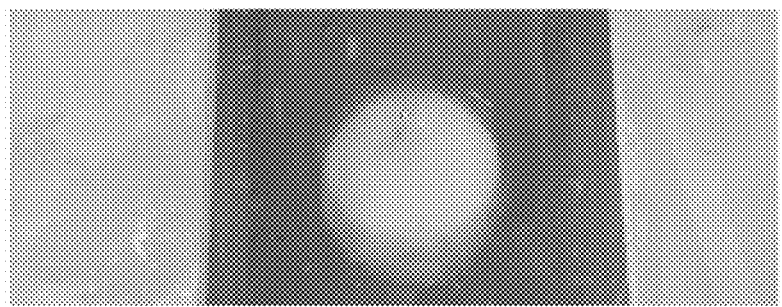
Figure 4D:
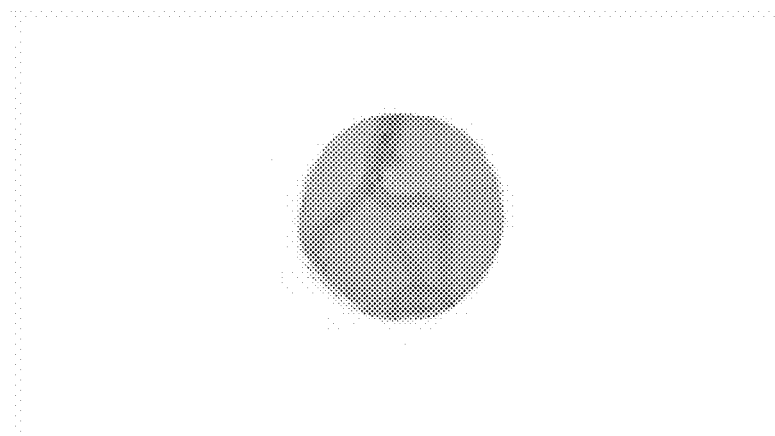
FIG. 4D is an image of a cross section of the 3D construct showing cleared channels within the 3D construct.

FIGS. 4A, 4B and 4C are screenshots from a video demonstrating a process of printing a 3D construct, in accordance with various embodiments disclosed herein. FIG. 4D is an image of a cross section of the 3D construct showing cleared channels within the 3D construct.

Figure 7:
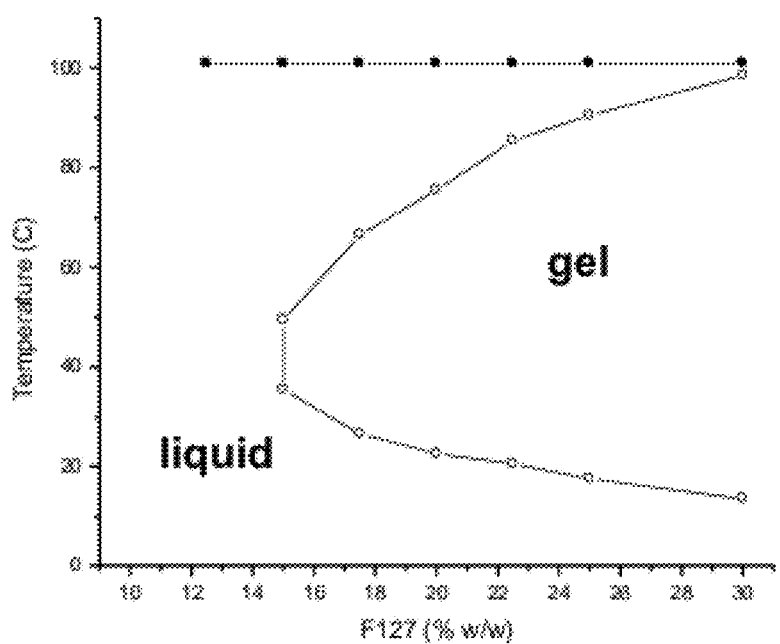
FIG. 7 is a phase diagram of Pluronic F127.

In FLIP printing, a free surface is created at the precursor-air interface. This permits direct deposition of material, for example using an extruder to deposit Pluronic F127 fibers. As shown in FIG. 4A, a GelMA (gelatin methacryloyl) cylinder 402 (compare 102 of FIG. 1) is formed from its precursor 408 (compare 108 of FIG. 1). Pluronic F127 gel fibers 414 (compare 114 of FIG. 1) are incorporated during formation of the GelMA by extrusion from a syringe 412 (compare 112 of FIG. 1). As shown in FIG. 4B, as support fluid (not visible from the figure, compare 106 of FIG. 1) flows in, the precursor 408 that is floating atop the support fluid is lifted upwards and flows over the deposited fibers 414. As shown in FIG. 4C, as photocrosslinking continues, the fibers 414 become encapsulated in the gel. Although the position of the extruder 412 between a projector (not visible from the figure, compare 110 of FIG. 1) and the precursor 408 may obstruct the projected patterns, the Pluronic F127 extrusion occurs in seconds, much faster than the photocrosslinking, and thus does not affect the crosslinking process appreciably. As shown in FIG. 4D, after the photocrosslinking is completed, the entire cylinder is immersed in a cold/ice bath, whereupon the F127 liquefies and clears out, resulting in channels within the GelMA cylinder. As shown in the phase change diagram of FIG. 7, F127 is a thermosensitive material that changes its physical state in response to changes in temperature. For example, at 20% w/w concentration, the F127 material is a liquid below 20° C., is a gel from about 20° C. to about 70° C., and liquefies again above 70° C. The sacrificial ink remains in gel state at the printing temperature, and melts away at either an elevated or a lowered temperature.

Bioprinting of Cells in Hydrogels Containing Nutrient-Supplying Channels

The ability to print soft hydrogel structures has clear applications in 3D bioprinting. However, in order to successfully print living constructs, two further goals have to be achieved.

Firstly, the 3D printing process itself should not be cytotoxic. To demonstrate the bioprinting potential of the presently disclosed FLIP printer, green fluorescent protein (GFP)-expressing fibroblasts were suspended in gelatin methacrylate (GelMA) and printed into a gelatin methacrylate (GelMA) matrix. The hydrogel constructs were cultured in cell culture media under static conditions (i.e., no active flow of the media). After 7 days, the hydrogel construct was cut in half, and stained with propidium iodide (PI) to identify dead cells.

Figure 5A:
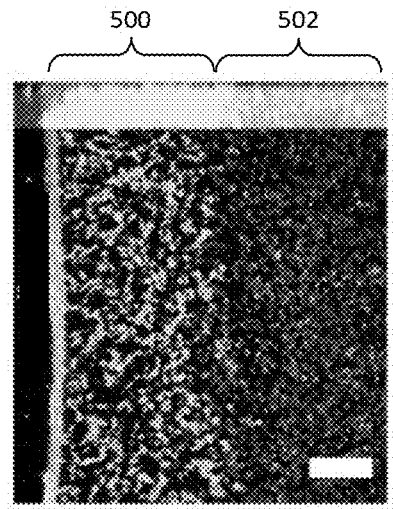
FIGS. 5A and 5B are micrographs showing cross sections of a hydrogel construct, in accordance with various embodiments disclosed herein. Scale bar=200 microns.
Figure 5B:
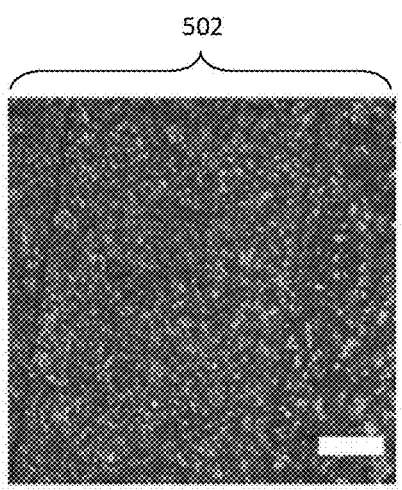

As a result of the mild printing conditions (without high shear, elevated temperatures, or excessive irradiation) and rapid printing, the cells remained viable one week post-printing. However, as shown in FIG. 5A, in the absence of printed channels, GFP-expressing cells were only visible around within a few hundred microns of the media-facing surface 500. Beyond a few hundred microns from the surface, the limited diffusion of nutrients resulted in a sharp drop-off in cell viability, with virtually no live cells visible at a core region 502 of such a gel. FIG. 5B is a micrograph of the core region/necrotic core 502 showing only dead, PI-stained cells.

This highlights the second condition necessary for bioprinting—that the printed structures must supply sufficient nutrients to support cellular metabolism, e.g., through one or more channels disposed within the printed structures. While it is possible to print channels directly, the tendency for over-crosslinking often results in very slow printing (using an excess of restraining dye to control the process), or channels that are partially obstructed. The presently disclosed method utilizes a fugitive ink strategy by depositing F127 fibers directly onto a partially printed construct during the printing process (see FIGS. 3A to 3D). This was possible because FLIP uses a contact-free strategy, allowing fibers to be deposited with an extruder onto the free surface, while the photocrosslinking proceeds without pausing. After printing, the construct was immersed in cold media, whereupon the fibers liquefied to form the channels, through which the cells were supported (see 322 of FIG. 3C). The advantage of these channels is apparent around a channel lumen, where GFP-expressing cells can be clearly seen, despite their location near the necrotic core of the gel.

Figure 6A:
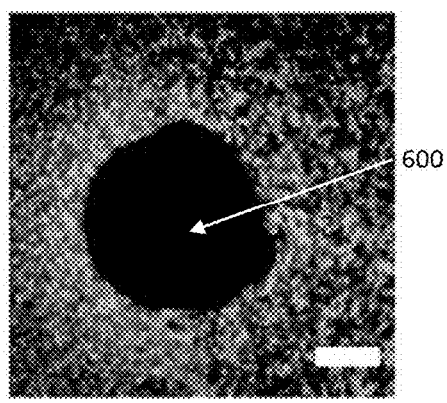
FIGS. 6A to 6C are micrographs showing cross sections of another hydrogel construct, in accordance with various embodiments disclosed herein. Scale bar=200 microns.
Figure 6B:
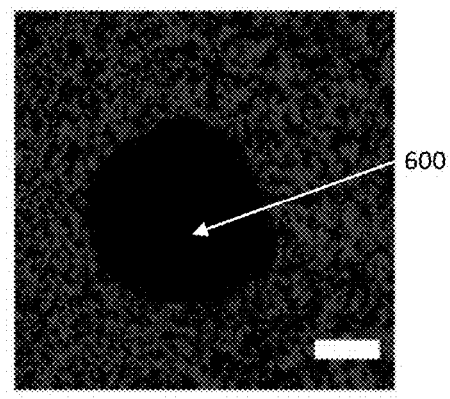
Figure 6C:
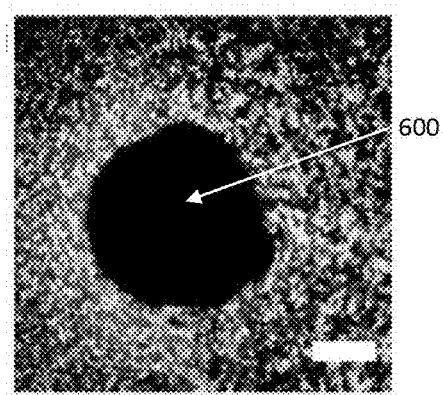

As shown in FIGS. 6A to 6C, green fluorescent protein (GFP)-expressing mouse fibroblasts were directly printed into a gelatin methacrylate (GelMA) matrix that contains a printed channel 600 at a similar location corresponding to the necrotic core 502 of FIG. 5A. GFP-expressing cells were clearly visible around the channel lumen (see FIG. 6A) even though the viability drops off after 100-200 microns from the lumen (see FIG. 6B). FIG. 6C is an overlay image of FIGS. 6A and 6B showing a gradual transition to lower viability.

It may be possible to extend the cell viability if media exchange were to occur by active flow, rather than the passive diffusion in this experiment. Appropriate design of the channels can allow active flow of media through the channels, rather than the passive diffusion in this experiment, which will in turn improve the cell viability further.

This experiment demonstrates the viability of fast and versatile bioprinting using the presently disclosed method and system, as rapid printing of cell-laden GelMA (at speeds of more than 70 mm/hr) may be achieved while easily incorporating a channel network of arbitrary designs to support cell viability.

DISCUSSION

Embodiments of the presently disclosed FLIP method and system provide a continuous 3D printing platform, that uses a fluid support strategy to enable printing of soft structures. Embodiments of the presently disclosed FLIP method and system may expand the role of 3D printing in biomedical applications, such as bioprinting of tissues. To that end, FLIP sought to address some of the technical challenges associated with bioprinting, including low mechanical stiffness of hydrogels; complex geometry associated with anatomical structures; low print speed of most existing bioprinters; and need for mild, cell-compatible printing conditions.

One of the main components of bioinks is typically hydrogels, due to their compatibility with cellular physiology. Although hydrogels are softer than traditional engineering materials like metals, plastics, and even many elastomers, it is important to note that even hydrogels made from ostensibly the same materials (e.g., PEG-diacrylate) can vary greatly in mechanical properties depending on the formulation. While megapascal hydrogels can be printed with various printers, including FLIP, for bioprinting purposes, the materials typically have Young's moduli of hundreds of kilopascals or less. This necessitates the use of supports for overhung structures, a need exacerbated by the fact that many anatomical structures are thin (e.g., blood vessels), and may contain voids (e.g., heart chambers).

To address this problem, possible support strategies may include printing with cryogenic support, direct printing into a gel that melts away at high temperatures, and printing into granular gels. While these strategies have their merits, all of them employ syringe-extrusion, which comes with their associated limitations. Furthermore, in the case of cryogenic support, the low temperature needed is also not compatible with cells, making direct cell printing challenging. In embodiments of the presently disclosed method, FLIP is adopted which uses an inert, stable fluid to provide buoyant forces that support complex structures from collapsing during the printing process. Using a perfluorinated support fluid allows it to be immiscible with an aqueous precursor, and may also minimize interaction with the organic components of the precursor, such as monomers, crosslinkers, and initiators. As a result, the support fluid in embodiments of the disclosed method does not cause any swelling of the hydrogel structure, and may be easily removed by rinsing under running water. Apart from printing overhung structures, the examples have demonstrated that it is possible to use the FLIP printer to estimate the conditions necessary to successfully print sub-millimeter scale, free-standing hollow structures, which have been difficult for many resin-based 3D printers.

It is worth highlighting that high print speed is not merely a matter of convenience; rather, since the printing conditions are often different from the final incubation conditions for the printed structures (in terms of osmolarity, temperature, pH, etc), the speed ensures that the cells can be quickly returned to the optimal culture conditions. FLIP achieves fast printing of soft materials without subjecting them to high shear, extreme temperatures, or other harsh conditions and was demonstrated to be compatible with cell printing (see FIGS. 5 and 6). By introducing channels into the printed structures, embodiments of the presently disclosed method and system also demonstrated the ability to address a fundamental challenge in bioprinting to provide nutrients to cells in a thick structure, beyond the diffusion limits. Due to the versatility of embodiments of the presently disclosed system and method, it is possible to optimize the size, density, and arrangement of the channels, to ensure that cells distributed throughout a structure can be adequately supplied. In addition to a fiber extruder, embodiments of the presently disclosed method may also be used in conjunction with acoustophoretic nozzles, which can establish concentration gradients of cytokines, growth factors, or other additives to create heterogeneous matrices. The speed, ease of use, and versatility that the FLIP currently possesses allow it to be applied to a wide variety of manufacturing and biomedical applications.

It will be appreciated by a person skilled in the art that other variations and/or modifications may be made to the embodiments disclosed herein without departing from the spirit or scope of the disclosure as broadly described. For example, in the description herein, features of different exemplary embodiments may be mixed, combined, interchanged, incorporated, adopted, modified, included etc. or the like across different exemplary embodiments. The present embodiments are, therefore, to be considered in all respects to be illustrative and not restrictive.

The invention claimed is:

1. A multimodality method of printing a three-dimensional (3D) construct or part thereof, the method comprising:
   (i) supporting a flowable precursor with a flowable support at a position that allows said flowable precursor to be crosslinked through irradiation by an irradiation source;
   (ii) depositing one or more materials on/within the flowable precursor; and
   (iii) crosslinking through irradiation by the irradiation source, at least part of the flowable precursor that is in contact with the one or more materials in the flowable precursor to form the 3D construct or part thereof.

2. The method as claimed in claim 1, further comprising:
   (iv) supporting the flowable precursor at a new position that allows the flowable precursor to be crosslinked through irradiation by the irradiation source;
   (v) optionally further depositing the one or more materials on/within the flowable precursor;
   (vi) further crosslinking through irradiation by the irradiation source, at least part of the flowable precursor that is optionally in contact with the one or more materials at the new position to form the 3D construct or part thereof; and
   (vii) optionally repeating steps (iv) to (vi) until a desired 3D construct is formed.

3. The method as claimed in claim 1, wherein depositing one or more materials comprises extruding a sacrificial material to form an arrangement of one or more sacrificial structures in the 3D construct.

4. The method as claimed in claim 3, further comprising removing the sacrificial material from the arrangement of one or more sacrificial structures to form an arrangement of one or more channels in the 3D construct.

5. The method as claimed in claim 4, wherein the one or more channels comprise open ends that facilitate fluid communication between an internal environment of the 3D construct and an external environment of the 3D construct.

6. The method as claimed in claim 3, wherein the sacrificial material is in a semi-solid or gel state when extruded to form the arrangement of one or more sacrificial structures.

7. The method as claimed in claim 4, wherein removing the sacrificial material comprises liquefying the sacrificial material to facilitate its removal from the 3D construct or part thereof.

8. The method as claimed in claim 7, wherein liquefying the sacrificial material comprises cooling the sacrificial material to a temperature that causes the sacrificial material to be liquefied.

9. The method as claimed in claim 1, wherein depositing one or more materials comprises propelling droplets containing the one or more materials on the flowable precursor.

10. The method as claimed in claim 9, wherein propelling droplets containing the one or more materials on the flowable precursor comprises propelling the droplets at a variable rate such that a spatial concentration gradient of the one or more materials is formed in the 3D construct.

11. The method as claimed in claim 1, wherein the step of crosslinking through irradiation by the irradiation source is carried out in a bottom-up direction such that the 3D construct or part thereof is formed layer by layer in the bottom-up direction.

12. The method as claimed in claim 1, wherein the step of crosslinking through irradiation by the irradiation source is carried out continuously.

13. The method as claimed in claim 1, wherein depositing the one or more materials on/within the flowable precursor comprises depositing the one or more materials in a top-down direction towards a top surface of the flowable precursor.

14. The method as claimed in claim 1, wherein the flowable support is immiscible with the flowable precursor.

15. The method as claimed in claim 1, wherein the flowable precursor and the one or more materials are biocompatible.

16. The method as claimed in claim 1, wherein the 3D construct has a higher density than the flowable precursor and the flowable support.

17. The method as claimed in claim 1, wherein the flowable precursor and/or the one or more materials comprise cells.

18. A multimodality system for performing the multimodality method as claimed in claim 1, the system comprising:
- a tank configured to contain a flowable support and a flowable precursor disposed above the flowable support;
- an irradiation source configured to irradiate the flowable precursor;
- one or more dispensing outlets disposed between the tank and the irradiation source and configured to deposit one or more materials on/within the flowable precursor;
- wherein the irradiation source is configured to crosslink through irradiation, at least part of the flowable precursor that is in contact with the one or more materials in the flowable precursor to form the 3D construct or part thereof.

19. The system as claimed in claim 18, wherein the one or more dispensing outlets comprise an extruder nozzle for extruding a sacrificial material to form a template for an arrangement of one or more channels in the 3D construct.

20. The system as claimed in claim 18, wherein the one or more dispensing outlets comprise an inkjet nozzle for propelling droplets containing the one or more materials on the flowable precursor.

\* \* \* \* \*